United States Patent [19]

Hauser

[11] Patent Number: 4,947,124

[45] Date of Patent: Aug. 7, 1990

[54] METHOD FOR CHARGING A NICKEL-CADMIUM ACCUMULATOR AND SIMULTANEOUSLY TESTING ITS CONDITION

[75] Inventor: Franz Hauser, Unterhaching, Fed. Rep. of Germany

[73] Assignee: Habra Elektronik GmbH, Munich, Fed. Rep. of Germany

[21] Appl. No.: 333,605

[22] Filed: Apr. 4, 1989

[30] Foreign Application Priority Data

Apr. 5, 1988 [DE] Fed. Rep. of Germany ....... 3811371

[51] Int. Cl.$^5$ .................... G01N 27/416; H02J 7/04
[52] U.S. Cl. ................................ 324/430; 324/427; 324/426; 320/48
[58] Field of Search ............... 324/430, 431, 432, 426, 324/427, 434; 320/48; 340/636

[56] References Cited

U.S. PATENT DOCUMENTS 4,423,378  12/1983  Marino et al. ................ 324/430 X
4,745,349  5/1988  Palanisamy et al. ............ 320/48 X

FOREIGN PATENT DOCUMENTS 0034003  8/1981  European Pat. Off. .

Primary Examiner—Reinhard J. Eisenzopf
Assistant Examiner—Jack B. Harvey
Attorney, Agent, or Firm—Darby & Darby

[57] ABSTRACT

A method for charging and simultaneously testing the condition of a nickel-cadmium accumulator wherein the charging cycle includes intervening measuring phases with discharging phases of relatively short duration. During the measuring phases, the internal resistance of the accumulator is measured under different charging and discharging conditions. The measured internal resistances are interrelated and additionally compared to internal resistances determined during successive measuring phases. The thus found relationships are used to derive therefrom a comprehensive spectrum of informations relating to various states of the accumulator, these informations being used for controlling the charging operation and permitting the state of usefulness of the accumulator to be assessed.

27 Claims, 1 Drawing Sheet

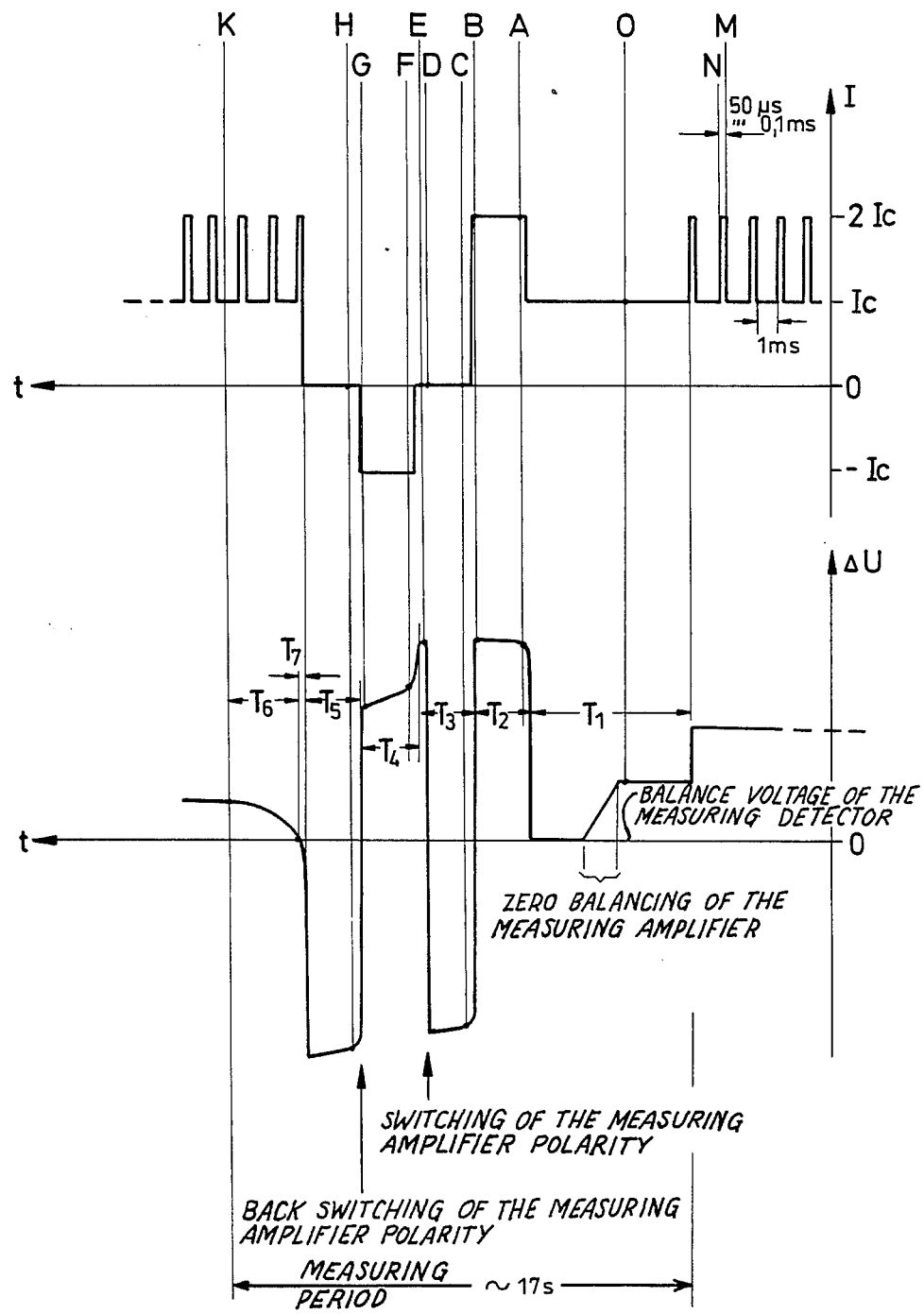

METHOD FOR CHARGING A NICKEL-CADMIUM ACCUMULATOR AND SIMULTANEOUSLY TESTING ITS CONDITION

BACKGROUND OF THE INVENTION

The invention relates to a method for charging and simultaneously testing the condition of a nickel-cadmium accumulator using a pulsing DC charging current of rectangular pulse shape including periods of low current intensity and periods of high current intensity, with cyclically intervening measuring phases including discharging intervals of relatively short duration, wherein the accumulator voltage is measured at the beginning of each high current-intensity period and at a preselected interval after the beginning of the respective period, and the difference of the thus measured voltage values is used for controlling the charging process. A method of this type is described in EP No. 0 034 003.

According to this publication, the change of the accumulator voltage during the charging operation is measured over a preselected time during part of a charging pulse or during part of a discharging period. The charging operation is discontinued when a parameter of the measured voltage exceeds a preselected characteristic, for instance when the voltage rises above a limit value. It is further stated that the change of the accumulator voltage is measured during a period which begins at the beginning of a charging pulse. The accumulator voltage is thus for instance measured immediately at the beginning of a charging pulse, and again two seconds later. When the accumulator is fully charged, the difference between the measured values is very important. If the measured voltage difference values are entered in a time chart, it becomes evident that the gradient of the resulting curve has a reversing point shortly before the fully charged state of the accumulator is attained, this reversing point offering itself as a criterium for discontinuing the charging operation, since this effect is independent of the temperature of the accumulator, which otherwise exerts considerable influence on the above-named voltage difference on its own.

The overcharging of a nickel-cadmium accumulator is not the only critical situation for an accumulator of this type. An accumulator consisting of mass-cells may thus not be charged in a quick-charging operation, a deep-frozen accumulator may only be charged very slowly, a completely discharged accumulator has to be re-formed prior to the charging operation proper, care has to be taken that the poles of the accumulator are properly connected, and other conditions have to be similarly observed. It is thus to be additionally observed that nickel-cadmium accumulators may assume other states in addition to the already mentioned states, which have to be taken into consideration for the charging process. The charging of a spent accumulator may thus no longer be worthwile, an accumulator in this state being better discarded. The same applies to an accumulator having a short-circuited cell. It is furthermore known that nickel-cadmium accumulators may suffer from a so-called memory effect. This means that an accumulator which has for a long time been operated under low loads or charged at weak currents is still capable of being charged to its full capacity, but is nevertheless not able to furnish a strong current under high load conditions. This state may for instance occur in the case of accumulators of radiophones which are for a long time operated in the stand-by mode and switched to transmitting operation only for short periods. This memory effect is particularly critical in the case of accumulators used for emergency current supply, for instance in the medico-technical field. It should therefore be possible to also identify this state.

SUMMARY OF THE INVENTION

It is an object of the invention to provide a method of the type defined in the introduction, which permits data of the most diverse nature concerning the condition and state of the accumulator to be obtained during the charging operation, which also includes intervening discharging periods, the thus obtained data to go far beyond the indication concerning the charging state of the accumulator.

The invention is based on the recognition that internal resistances of the accumulator determined under different charging and discharging conditions, specifically the interrelation of these resistances and their successive development during the charging operation, permit highly conclusive analyses regarding the state and condition of the accumulator to be derived therefrom, these analyses going far beyond the mere determination of the charging state. It is thus an important aspect of the invention that during a measuring phase the voltage of or applied to the accumulator is measured under the most different operating conditions, the thus measured voltage being stored and subsequently evaluated in view also of the prevailing charging current intensities. The invention thus permits the relative charging state to be determined on the base of characteristics associated to a specific accumulator. It is also possible to determine the effective capacity of an accumulator. In actual practice an accumulator is usually considered useless and discarded when its effective capacity has dropped to a predetermined percentage, for instance 60 to 80% of its rated capacity.

The charging, particularly the quick-charging of a deep-cooled or frozen nickel-cadmium accumulator is highly dangerous for the accumulator. Certain known accumulators are equipped with temperature sensors mainly provided for the purpose of interrupting the charging operation, because it is known that the temperature of a nickel-cadmium accumulator under normal environmental conditions gives a useful indication for determining the charging state, so that it is conceivable to use a temperature sensor of this type for sensing the deep-cooled state of the accumulator and for controlling the charging program accordingly. This method is not feasible, however, when such temperature sensors do not exist, as in many cases. The invention also provides a remedy for this defect, since it permits a conclusion relating to the actual temperature of the accumulator to be drawn from the interrelation of the internal resistances determined under different charging conditions.

A similar aspect also applies to a completely discharged accumulator. When charging such an accumulator with the usual charging current, the accumulator will very rapidly show effects comparable to those observed at the end of the charging operation when an accumulator is fully charged. If these effects were to be used for controlling the charging operation, the charging operation would be very early discontinued, although the accumulator is still far from being fully charged. Under certain conditions, the completely discharged state may even result in a reversal of the polarity of an accumulator. A completely discharged accumulator has therefore to be reformed in the first place before it can be charged in the normal manner. The method according to the invention also permits this state to be recognized.

The invention and further details and advantages thereof shall now be explained in detail with reference to the drawing.

BRIEF DESCRIPTION OF THE DRAWINGS

The drawing shows a time-diagram of the charging current in the method according to the invention, of the resulting voltage at the accumulator, and of the plurality of measuring instances O to K whereat the voltage at the accumulator is measured.

DESCRIPTION OF THE PREFERRED EMBODIMENT

In this diagram, the voltage curve merely shows voltage difference values in relation to a balancing voltage. This is because it is usually not the absolute value of voltages which are of interest for the evaluation, but rather the voltage changes at the accumulator caused by the charging and load-applying operations.

The measuring amplifier used for the voltage measurements is therefore zero-balanced at the beginning of each measuring phase, this provision simultaneously permitting to obtain a relatively wide measuring range. For the same reason the invention preferably provides that the polarity of the accumulator voltage applied to the measuring amplifier is evaluated in an inverted state during a load interval lying within the measuring phase. For this reason the drawing shows the development of the voltage during the load interval on the positive side.

It is also advantageous when the measured voltages are standardized in the measuring operation, for instance by selecting the voltage of a single cell, because this permits the expenditure for the required apparatus to be restricted, even when accumulators having different numbers of cells are to be tested. This standardization of the voltage can be accomplished in a charging and testing apparatus with the aid of switches, plugs or the like, which may additionally be used to select the charging current intensity in conformity to the specific capacity of an accumulator to be charged and tested.

In practical applications the invention provides that a complete charging cycle consists of a charging phase of for instance about 2.5 to 3 minutes and a subsequent measuring phase. During the charging phase the accumulator is charged with a preselected nominal current $I_n$ in the case of a mass-cell usually the magnitude of the so-called ten-hour charging current $I_{10}$. In the case of an ampere-hour efficiency of 100%, this charging current would result in that the accumulator is charged to its rated capacity within ten hours. A mass-cell accumulator of this type is usually considered as having been fully charged when it has been charged for 14 hours with this charging current $I_{10}$, i.e. when a charging factor of 1.4 has been employed. A sinter-cell accumulator on the other hand can be charged with a charging current of ten times the above value and designated by $I_C$. A charging operation of this type is referred to as a quick-charging operation. This charging operation is illustrated in the drawing, wherein the charging current is $I_C$. In the example shown, this charging current is supplied as a charging pulse lasting about 2.5 to 3 minutes and has superimposed thereon short current pulses of a higher current intensity, which in the case of sinter cells have a duration of about 50 microseconds to 2 ms, and are supplied at intervals corresponding to about ten times the duration of the pulses.

In the case of mass cells, the duration of the short superimposed pulses is about 50 us to 0.1 milliseconds, and the intervals therebetween are about sixty times this duration. The pulse lengths or durations are not shown to scale in the drawing. The current intensity of these short pulses is about $I_C$ to $2I_C$ in the case of mass-cell accumulators, and in the case of sinter-cell accumulators about $2I_C$ to $4I_C$. In the drawing the pulse length has been given as $2I_C$.

Before the measurements proper are taken in the measuring phase, the short superimposed pulses of higher current intensity are discontinued for a selected period $T_1$ of about 3 sec at the end of the charging pulse to thereby permit the accumulator to assume a state of equilibrium. It is also this period during which the above mentioned zero-balancing of the measuring amplifier takes place.

Subsequently the accumulator is charged with a higher current for a preselected period of about two seconds. The intensity of this higher current is $2I_C$ (as illustrated) to $4I_C$ in the case of sinter-cell accumulators, and 1 to $2I_C$ in the case of mass-cell -accumulators. This interval or period has been designated $T_2$ in the drawing.

This is followed by an interval or period $T_3$ of about two seconds, during which the accumulator is in the no-current state. Shortly before the end of this period the polarity of the measuring amplifier is reversed in the example shown. In the voltage curve shown in the drawing, this is illustrated by a jump from the negative to the positive relative to the balancing voltage.

Subsequently the accumulator is put under load with a current having the magnitude $-I_C$ for a period $T_4$.

The load period is followed by a period $T_5$ during which the accumulator is in a no-current state.

In the following periods $T_7$ and $T_6$ the normal charging operation is resumed by supplying the charging current $I_C$ (in the case of sinter-cell accumulators) or the current $I_{10}$ (in the case of mass-cell accumulators) to the accumulator, the respective charging current having the short pulses superimposed thereon.

The following measurements or tests are conducted during the measuring phase:

during period $T_2$, a voltage measurement A shortly after the beginning of this period, and a voltage measurement B at the end of the period;

during the first no-current period $T_3$, a voltage measurement C shortly after the beginning of this period, and a voltage measurement D at the end of the period. The voltage is once again measured during this period $T_3$ after the polarity of the measuring amplifier has been reversed, to thereby eliminate any deviations due to the reversing of the polarity (measurement E);

during the load period $T_4$, a voltage measurement F at a preselected instant after the beginning of this period, at which the voltage has dropped to a substantially constant value, and a measurement G at the end of the load period;

during the second no-current period $T_5$, a voltage measurement H shortly after the polarity of the measuring amplifier has been again reversed.

The term "shortly after" in this context designates an interval of sufficient length for permitting the accumulator voltage to be detected outside of a strongly curved portion of the voltage curve, preferably about 0.2 sec.

After a preselected period $T_6$, which may be about two seconds, the accumulator voltage is again determined by a measurement K at an instant not coinciding with one of the superimposed short charging current pulses. The measurement may also be carried out, however, without considering the timing of the short charging current pulses, in which case an integration of the voltage is required.

The measuring phase thus begins with the interruption of the superimposed short charging current pulses at the beginning of period $T_1$, and ends with the expiry of period $T_6$. Its length is about 17 seconds.

It shall now be explained how the measured voltage values and associated current intensities are processed together and in relation to one another, what deductions are drawn therefrom, and which consequences are derived therefrom for the accumulator charging operation.

The accumulator voltages measured in the voltage measurements O to K and the per se known associated current intensities are used for determining internal resistances of the accumulator.

These internal resistances, in combination with determined resistances, are used for determining resistance differences and resistance quotients.

The resistances, resistance difference and resistance quotient values, respectively, are temporarily stored.

Also calculated are differential values between resistances determined in any two successive measuring phases.

The age or use of the accumulator is determined as follows:
- fresh from the factory, when in the base-charged (weakly pre-charged) state $R_6 \sim 4R_1$ and $R_3 \sim 2R_1$ and $\delta R_1 < 0.4 R_1$, and the trend of $\delta R_1$ is continuous over a plurality of measuring phases,
- new, when during the charging operation $R_3 \leq R_6$ and $R_1 \leq R_3$ and $R_4/R_2 \geq 2$,
- heavily used, when $R_3 > R_6$ and $R_1 > R_3$ and $R_4/R_2 < 2$, or when $R_2 > R_4$ during the charging operation,
- spent, when each of $R_3$, $R_5$ and $R_6 > 3R_1$ and $R_3/R_6 > 1.3$, and when $R_2 > R_4$ during the charging operation, or when $\delta R_1 > 0.4 R_1$ and the trend of $\delta R_1$ is irregular, wherein
- $R_1$ is the difference of internal resistances determined in tests A and B,
- $R_2$ is the difference of the internal resistances determined in tests B and C,
- $R_3$ is the difference of the internal resistances determined in tests D and C,
- $R_4$ is the difference of the internal resistances determined in tests E and F,
- $R_5$ is the difference of the internal resistances determined in tests G and F,
- $R_6$ is the difference of the internal resistances determined in tests H and D, and
- $R_1$ is the difference of the internal resistances determined in tests B of two successive measuring phases.

The charging state of the accumulator is determined as follows:
- full, when $R_3 = R_6$ in a scarcely used accumulator, or when $R_3 > R_6$ and $R_1 \geq R_5$ in a used accumulator,
- nearly full, when $R_3/R_1 \sim 9 \ldots$ and at the same time each of $QR_1$, $QR_3$, and $QR_5$ is positive,
- partially discharged, when $R_3/R_1 \sim 4 \ldots 8$ and at the same time each of $QR_1$, $QR_3$, $QR_5$ and $QR_6$ is 0, or $R_1$ is negative,
- discharged, when $R_3/R_1 \sim 1 \ldots 3$, and at the same time each of $QR_1$, $QR_3$, $QR_5$ and $QR_6$ is negative in the beginning phase of the charging operation, and
- completely discharged, when in the first measuring phase each of $R_1$, $R_2$, $R_3$, $R_4$, $R_5$ and $R_6$ is above a limit value associated to the specific accumulator, and when $R_4 > 4R_0$ and $QR_1$ initially increases, and subsequently decreases during successive measuring phases, or the polarity of the accumulator voltage is opposite to that of the charging voltage, wherein
- $R_0$ is the difference of the internal resistances determined in tests O of two successive measuring phases,
- $R_1$, $R_3$, $R_5$ and $R_6$ are as defined above, and $QR_1$, $QR_3$, $QR_5$ and $QR_6$, respectively, are the quotients of two values of $R_1$, $R_3$, $R_5$ and $R_6$ determined in successive measuring phases.

Temperature:
The accumulator is too cold when $R_A > 5R_0$ and $R_1/R_3 > 3$, wherein $R_A$ is the internal resistance determined in test A and $R_3$ is as defined above.

The state which has to be considered as "too cold" depends on the type of the accumulator. There are types of accumulators for which a temperature of 0° C. is already considered "too cold", whereas other types of accumulators can still be normally charged at temperatures of about $-10°$ C. The internal state of the accumulator determined by resistance measurements according to the invention, irrespective of the type of the accumulator, is a characteristic which may influence the charging program accordingly. When the temperature of the accumulator is found to be too cold, the charging current is immediately reduced to one half. If subsequent measurements under these charging current conditions still result in unacceptable measuring and evaluation results, the charging current is again reduced by one half. If the subsequent results should still be found inacceptible, the charging program will be considered unsuitable for the respective accumulator.

A differentiation as to the type of accumulator can be made in the following manner:

When $R_1$ and $R_A$ lie above a preselected limit value associated to the specific accumulator, and at the same time $R_4 > \sim 3R_0$, or the cell voltage lies above a predetermined limit value, the accumulator is a mass-cell accumulator or a sinter-cell accumulator of a too small capacity for the selected charging current.

A reformation of the accumulator is required when the trend of $QR_1$ is very highly positive in the initial phase of the charging operation.

The accumulator has no capacity when $R_4 > 4R_0$ and all of the remaining resistances are considerably above characteristic standard values of the specific accumulator. In this context the term "no capacity" implies that the accumulator has less than about 40% of its rated capacity. The term capacity is not intended to designate the actual charge of the accumulator, but rather the charge-acceptance and current supply capacity of the accumulator.

The accumulator suffers from the so-called memory effect, as defined in the introduction, when $R_1$ and $R_4$ decrease in successive measuring phases and at the same time $R_4 > \sim 1.1 R_4$, provided that the charging operation is carried out with the maximum permissible currents in consideration of established limit values.

The above-named values $QR_1$, $QR_3$, $QR_5$ and $QR_6$ are the quotients, respectively, of the values $R_1$, $R_3$, $R_5$ and $R_6$ determined in two successive measuring phases.

The end of the charging operation for a new accumulator can be determined by the evaluation of $R_0$. If $R_0$ turns negative in the course of the charging operation, the charging operation is discontinued. In the case of a used accumulator, the evaluation is carried out with reference to $R_1$. If $R_1$ tends towards the negative, the charging operation is discontinued. In the case of a heavily used, "stressed" accumulator, the assessment is based on $\delta R_6$. If $\delta R_6$ tends towards the negative, the charging operation is discontinued. $\delta R_6$ is the difference between the resistances $R_6$ determined in two successive measuring phases.

As already mentioned, the complete discharge of an accumulator may result in that its polarity is reversed. In order to recognize whether a given accumulator is inversely connected or the connected accumulator is completely discharged, when a polarity opposite to that of the charging voltage is noted, the accumulator is initially charged with a low sensor current of about $I_C/1000$. An inversely connected accumulator will not reduce its voltage in response to this charging voltage. This will be recognized as an indication that the accumulator is inversely connected. In contrast thereto, a completely discharged accumulator will slowly reduce its "wrong voltage" towards Zero. This process is recognized. As soon as the accumulator voltage is at zero, the accumulator is charged with a somewhat higher charging current of $I_C/100$ until a voltage of about 0.3 Volts is attained, whereupon the charging operation is continued with a current of $I_C/10$, until a voltage of 0.8 Volts is attained. If the charging operation is continued with this current, the accumulator voltage has to rise to about 1.2 Volts within a determined period (about 12 minutes). In this state the accumulator is still "dead", i.e. it has not yet a storage capacity, and has to be reformed.

The re-forming process is carries out as follows:

The accumulator is cyclically charged with a charging current of $I_{10}$ for a determined period of for instance three minutes, and subsequently discharged to a voltage of 1 Volt per cell. The increase of the differential internal resistance of each charging phase of the cycles is measured. It is initially positive and is then progressively reduced. At the end this increase is totally flattened out. During the discharging phases, the time is measured until the voltage of 1 Volt per cell is attained. The charging and discharging operations are continued until the times required for attaining the voltage of 1 Volt/cell during the discharging phase are substantially constant, or until the differential internal resistance is zero at the end of the charging phase.

If an accumulator is too cold, it is charged with a reduced charging current. A sinter-cell accumulator for instance is charged only with $I_{10}$. The superimposed short charging current pulses enable the cold accumulator to accept the charging current of the above-named magnitude.

The above-named short pulses serve the additional purpose of continuously verifying whether the selected charging program can be suitably executed with the respective accumulator. To this purpose a voltage measurement (tests M and N) is carried out at the beginning and at the end of each of the superimposed short pulses, to thereby determine the differential internal resistance of the accumulator. In the case of an accumulator being charged with an excessively high charging current, the differential internal resistance shows a very steep increase, from which it may be deduced that the accumulator is of the wrong type.

When it is intended to carry out a quick-charging program, the charging operation is initially also carried out with a charging current of $I_{10}$ for safety reasons. During the first measuring phase already it is determined whether the accumulator to be charged is a masscell accumulator or a sinter-cell accumulator. Immediately after the first measuring phase the charging operation is then switched over to the quick-charging mode when it has been found that the respective accumulator is a sinter-cell accumulator. The charging operation is otherwise continued with the charging current $I_{10}$.

The same also applies when the accumulator to be charged is very cold. As already explained, an accumulator otherwise suitable for the quick-charging process may be incapable of being quick-charged when it is too cold. The charging program with the reduced charging current is then continued until the measurements taken during the measuring phases show that the accumulator is prepared to accept the quick-charging process due to the rise of its temperature.

It is to be understood that some of the criteria selected for the measurements proceed from the assumption that the selected charging current has been selected in accordance with the capacity of the accumulator. An accumulator fitting the selected charging current will normally not show an erratic response, although it will react in a special manner, for instance, when it is completely discharged, too cold, spent, or suffers from an electrode short-circuit. An accumulator not fitting the selected charging current, for instance by having an insufficient nominal capacity, but which otherwise does not show any exceptional conditions such as a completely discharged state or an excessively low temperature, will also be recognized by the charging and testing method according to the invention. On the base of this recognition the required measures will be taken, i.e. the charging operation will be continued with a reduced charging current, or it will be discontinued if so required.

A particular advantage results from the superimposition of the short pulses onto the charging current, because these pulses permit the differential internal resistance of the accumulator to be continuously monitored, specifically also during the longer charging current pulse periods (2.5 to 3 minutes), during which no measurements could otherwise be taken, as likewise evident from the state of the art.

As far as reference is made in the description and in the claims to limit values characteristic of any specific accumulator, it shall be pointed out that the respective limit values can be taken from the data sheets of the accumulators' manufacturers or calculated therefrom.

I claim:

1. A method for charging and simultaneously testing the condition of a nickel-cadmium accumulator using a pulsing DC charging current of rectangular pulse shape including periods of low current intensity and periods of high current intensity, with cyclically intervening measuring phases including discharging intervals of relatively short duration, wherein the accumulator voltage is measured at the beginning of each high current-intensity period and at a preselected interval after the beginning of the respective period, and the difference of the thus measured voltage values is used for controlling the charging process, the method comprising for each measuring phase the steps of:

a. providing a charging current pulse to be a rectangular pulse with a nominal current intensity $I_N$,
b. before the end of the charging current pulse of the nominal current intensity $I_N$, measuring the accumulator voltage (test O) and storing the measured accumulator voltage as a balancing voltage,
c. charging thereafter the accumulator with a higher current intensity for a preselected period ($T_2$) of about 1 to 2 seconds, the higher current intensity being higher than $I_C$ which is the capacity of the accumulator, the higher current intensity being higher than the nominal current intensity, the accumulator voltage being measured about 0.2 sec after the beginning and at the end of this period ($T_2$) (tests A and B),
d. subsequently interrupting the current to the accumulator for a preselected period ($T_3$) of about 1 to 2 seconds, the accumulator voltage being measured about 0.2 sec. after the beginning and at the end of this period ($T_3$) (tests C and D),
e. putting the accumulator under load with a load current of the magnitude $-I_C$ for a preselected load period ($T_4$) of about 1 to 2 seconds, the accumulator voltage being measured immediately before the beginning, about 0.2 seconds after the beginning, and at the end of the load period ($T_4$) (tests E, F and G),
f. subsequently interrupting again the accumulator current for a preselected period ($T_5$) of about 1 to 2 seconds, the accumulator voltage being measured about 0.2 seconds after the beginning of this period ($T_5$) (test H),
g. resuming the charging operation with a subsequent charging current pulse,
h. determining the respective internal resistances of the accumulator from the measured voltage values and the associated current intensities, and
i. the internal resistances determined in one measuring phase are interrelated with one another, and the interior resistances determined in corresponding tests of successive measuring phases are interrelated with one another, to result in data relating to the condition, the use, the charging state, the temperature and the type of the accumulator.

2. A method according to claim 1, characterized in that the use of the accumulator is determined as follows:
fresh from the factory, when in the base-charged (weakly pre-charged) state $R_6 \sim 4R_1$ and $R_3 \sim 2R_1$ and $\delta R_1 < 0.4 R_1$, and the trend of $\delta R_1$ is continuous over a plurality of measuring phases,
new, when during the charging operation $R_3 \leq R_6$ and $R_1 \leq R_3$ and $R_4/R_2 \geq 2$,
heavily used, when $R_3 > R_6$ and $R_1 > R_3$ and $R_4/R_2 < 2$, or when $R_2 > R_4$ during the charging operation,
spent, when each of $R_3$, $R_5$ and $R_6 > 3R_1$ and $R_3/R_6 > 1.3$, and when $R_2 > R_4$ during the charging operation, or when $\delta R_1 > 0.4 R_1$ and the trend of $\delta R_1$ is irregular, wherein $R_1$ is the difference of internal resistances determined in tests A and B,
$R_2$ is the difference of the internal resistances determined in tests B and C,
$R_3$ is the difference of the internal resistances determined in tests D and C,
$R_4$ is the difference of the internal resistances determined in tests E and F,
$R_5$ is the difference of the internal resistances determined in tests G and F,
$R_6$ is the difference of the internal resistances determined in tests H and D, and
$\delta R_1$ is the difference of the internal resistances determined in tests B of two subsequent measuring phases.

3. A method according to claim 2, characterized in that the charging state of the accumulator is determined as follows:
full, when $R_3 = R_6$ in a scarcely used accumulator, or when $R_3 > R_6$ and $R_1 \geq R_5$ in a used accumulator,
nearly full, when $R_3/R_1 \sim 9$ to $\infty$ and at the same time each of $QR_1$, $QR_3$, and $QR_5$ is positive,
partially discharged, when $R_3/R_1 \sim 4$ to 8 and at the same time each of $QR_1$, $QR_3$, $QR_5$ and $QR_6$ is 0, or $R_1$ is negative,
discharged, when $R_3/R_1 \sim 1$ to 3, and at the same time each of $QR_1$, $QR_3$, $QR_5$ and $QR_6$ is negative initially at a beginning of the charging operation, and
completely discharged, when in the first measuring phase each of $R_1$, $R_2$, $R_3$, $R_4$, $R_5$ and $R_6$ is above a limit value associated to the specific accumulator, and when $R_4 > 4R_0$ and $QR_1$ initially increases, and subsequently decreases during subsequent measuring phases, or the polarity of the accumulator voltage is opposite to that of the charging voltage,
wherein $R_0$ is the difference of the internal resistances determined based on the measured voltage values of two successive measuring phases with respect to test O, and
$QR_1$, $QR_3$, $QR_5$ and $QR_6$, respectively, are the quotients of two values of $R_1$, $R_3$, $R_5$ and $R_6$ determined in successive measuring phases.

4. A method according to claim 3, characterized in that a state, in which re-forming of polarity of the accumulator is required, is determined based on the beginning phase of the charging operation where $QR_1$ increases.

5. A method according to claim 3, characterized in that the state according to which the accumulator has no capacity is determined from the fact that $R_4 > 4R_0$ and all of the remaining resistances are greatly above characteristic values associated to the specific accumulator.

6. A method according to claim 3, characterized in that a deep-frozen state of the accumulator is determined as follows:
$R_4 > 5R_0$ and $R_1/R_3 > 3$,
wherein $R_4$ is the internal resistance determined in tests A.

7. A method according to claim 6, characterized in that the type of accumulator is determined as follows:
the accumulator is of the mass cell accumulator type or of a sinter cell accumulator type the capacity of which is too low for the charging current, when $R_1$ and $R_4$ are above a determined limit value associated to the specific accumulator, when $R_4 > 3R_0$, or the cell voltage lies above a determined limit value.

8. A method according to claim 6, characterized in that the state according to which the accumulator suffers from a so-called memory effect is determined from the fact that in successive measuring phases $R_1$ and $R_4$ decrease and $R_4 > \sim 1.1 R_A$, when the charging operation is carried out with the maximum permissible currents within given limit values.

9. A method according to claim 2, characterized in that, after the step of resuming the charging operation, the accumulator voltage is measured at a preselected period ($T_6$) of about 2 seconds after surpassing a balancing voltage (test K) so as to determine an internal resistance ($R_K$), and that an indication of the state of use of the accumulator is derived from the internal resistance ($R_K$).

10. A method according to claim 9, characterized in that a period ($T_7$) from the beginning of the subsequent charging pulse after the no-current condition to the end of the subsequent charging pulse measured, and an indication of the use of the accumulator is derived from this period ($T_7$).

11. A method according to claim 9, characterized in that the characteristic of interrelationships of the differences ($\delta R_K$) of the internal resistances ($R_K$) determined in tests K of successive measuring phases is used for deriving therefrom an indication of the charging state of the accumulator.

12. A method according to claim 1, characterized in that the charging current pulse has superimposed thereon at short intervals very short charging current pulses of a higher current intensity, the length of said superimposed pulses being of a magnitude of 50 μs to 2 ms, that the accumulator voltage is measured at the beginning and shortly after the end of each of these short charging current pulses (tests M and N), and that a state of equilibrium is established in the accumulator before the end of the charging current pulse by interrupting the short superimposed charging current pulses for a preselected period ($T_1$) a short time before the end of which the test 0 is carried out, and that the differential internal resistance of the accumulator is continuously determined from tests M and N, the charging operation being discontinued when the differential internal resistance exceeds a limit value associated to the specific accumulator.

13. A method according to claim 12, characterized in that the intervals between the superimposed short pulses are about 10 to 60 times the length of the short pulses.

14. A method according to claim 11, characterized in that the superimposed short charging current pulses have a current intensity of $I_C$ to $2I_C$ when charging mass cells.

15. A method according to claim 1, characterized in that $I_N = I_C$ when charging sinter cells.

16. A method according to claim 13 or 15, characterized in that the superimposed short charging current pulses have a current intensity of $2I_C$ to $4I_C$ when charging sinter cells.

17. A method according to claim 1, characterized in that $I_N = I_{10}$ when charging mass cells, in which $I_{10}$ is a ten-hour charging current.

18. A method according to claim 1, characterized in that after an accumulator has been connected, the charging operation is initially carried out with a charging current IN of the intensity $I_{10}$ in every case.

19. A method according to claim 1, characterized in that prior to the supply of the pulsed charging current, the accumulator is charged with a very small (sensor) current of about $I_C/1000$ and, in the case of different polarities of the accumulator voltage and the charging voltage, the successive development of the accumulator voltage resulting from the charging operation with the sensor charging current is monitored, and that, if the accumulator voltage gradually drops, the charging operation with the sensor current is continued until the accumulator voltage value of 0 has been reached, whereupon the charging operation is continued with a higher charging current of $I_C/100$ until 0.3 volts has been reached, and the charging operation is further continued with $I_C/10$ until an accumulator voltage of about 0.8 volts has been reached, before the charging operation is continued with a reformation of the accumulator, whereas the charging operation is discontinued if the accumulator voltage does not drop during the charging operation with the sensor current 20. A method according to claim 1, characterized in that prior to the voltage measurements during the measuring phase, a zero balancing operation of a measuring amplifier is initially performed and that the accumulator voltages are subsequently measured on the basis of this balancing voltage.

21. A method according to claim 20, characterized in that the accumulator voltage applied to the measuring amplifier during the load period ($T_4$) is evaluated in an inverted state.

22. A method for charging and simultaneously testing a condition of an accumulator, comprising the steps of:
(a) applying a charging current to an accumulator, the charging current including a charging pulse superimposed by a current pulse of higher current intensity than said charging pulse;
(b) discontinuing the superimposition of the current pulse to enable the accumulator to reach a state of equilibrium with respect to the charging pulse;
(c) charging the accumulator with a higher current which is higher in intensity than that of the charging pulse;
(d) interrupting the charging with the higher current and thereby the charging current so that the accumulator enters into a no-current state;
(e) charging the accumulator with a load current;
(f) interrupting the charging with the load current so that the accumulator enters into a no-current state;
(g) measuring accumulator voltage after about 0.2 seconds from a beginning of steps (c) to (f) and at an end of steps (c) to (e) and also before the beginning of step (c) and after the end of step (d), the measuring during each of the steps (c) to (f) constituting a measuring phase;
(h) determining respective internal resistances of the accumulator from the measured accumulator voltage of step (g) and from associated current intensities; and
(i) comparing interrelationships between the internal resistances for each measuring phase and in successive measuring phases so as to obtain results indicative of a condition, a use, a charging state, a temperature and a type of the accumulator.

23. A method as in claim 22, wherein step (g) takes place with a measuring amplifier, the step of measuring the accumulator voltage before the beginning of step (e) and after the end of step (d) taking place after reversing a polarity of the measuring amplifier, further comprising the step of:

zero balancing the measuring amplifier at a beginning of each of the measuring phases.

24. A method as in claim 22, wherein the step of comparing includes comparing differences between the internal resistances so as to thereby obtain an indication of the use of the accumulator.

25. A method as in claim 22, wherein the step of interrelating includes comparing differences between the internal resistances and comparing quotients of the differences between the internal resistances so as to obtain an indication of the condition of the accumulator.

26. A method as in claim 22, further comprising:
(k) measuring the accumulator voltage after commencement of step (b) but before commencement of step (c); and
(l) determining an internal resistance of the measured accumulator voltage of step (k), the step of comparing including comparing the internal resistance of step (l) with other internal resistances and comparing a quotient of differences of the internal resistances with a constant so as to obtain an indication of a deep-frozen state.

27. A method as in claim 22, further comprising:
(k) measuring the accumulator voltage after commencement of step (b) but before commencement of step (c); and
(l) determining an internal resistance of the measured accumulator voltage of step (k), the step of comparing including comparing the internal resistance determined in step (l) and comparing differences of internal resistances with limit values associated with types of accumulators so as to obtain an indication of the type of accumulator.

* * * * *